(12) United States Patent
Dahle et al.

(10) Patent No.: US 10,750,125 B2
(45) Date of Patent: Aug. 18, 2020

(54) AUTOMATIC DEPLOYMENT OF DISTRIBUTED VIDEO CONFERENCE SYSTEM

(71) Applicant: Pexip AS, Oslo (NO)

(72) Inventors: Håkon Dahle, Oslo (NO); Nico Cormier, Oslo (NO); Andreas Nervik Wintervold, Hakadal (NO); Lukasz Zgrzebski, Oslo (NO); Peter Boba, Snarøya (NO); Thomas Guggenbuhl, Oslo (NO)

(73) Assignee: Pexip AS, Oslo (NO)

( * ) Notice: Subject to any disclaimer, the term of this patent is extended or adjusted under 35 U.S.C. 154(b) by 0 days.

(21) Appl. No.: 16/432,008

(22) Filed: Jun. 5, 2019

(65) Prior Publication Data

US 2020/0007819 A1    Jan. 2, 2020

(51) Int. Cl.
*H04N 7/15*    (2006.01)
*H04L 29/06*    (2006.01)
*H04L 29/08*    (2006.01)

(52) U.S. Cl.
CPC ............. *H04N 7/15* (2013.01); *H04L 65/403* (2013.01); *H04L 67/10* (2013.01)

(58) Field of Classification Search
CPC combination set(s) only.
See application file for complete search history.

(56) References Cited

U.S. PATENT DOCUMENTS

2014/0139614 A1    5/2014 Swanson et al.
2014/0280595 A1*    9/2014 Mani .................. H04L 12/1827
709/204

(Continued)

FOREIGN PATENT DOCUMENTS

EP    2936803 B1    2/2017
EP    3293969 A1    3/2018

(Continued)

OTHER PUBLICATIONS

Norwegian Examination and Search Report dated Jan. 21, 2019 for corresponding International Application No. 20180905; International Filing Date: Jun. 27, 2018 consisting of 8-pages.

*Primary Examiner* — Phung-Hoang J Nguyen
(74) *Attorney, Agent, or Firm* — Christopher & Weisberg, P.A.

(57) ABSTRACT

An orchestration server and a method of deploying a distributed videoconferencing system in cloud services are disclosed. The method including receiving, by an orchestration server, a proposed configuration of a distributed videoconferencing system, determining, by the orchestration server, a status of the proposed configuration of the distributed videoconferencing system, determining, by the orchestration server, based on the status of the proposed configuration of the distributed videoconferencing system, a determined configuration of the distributed videoconferencing system, initiating, by the orchestration server, according to the determined configuration of the distributed videoconferencing system at least one non-transcoding node at a first data center of a first cloud service provider, and initiating, by the orchestration server, according to the determined configuration of the distributed videoconferencing system at least one transcoding node at a second data center.

11 Claims, 6 Drawing Sheets

(56) References Cited

U.S. PATENT DOCUMENTS

| | | | |
|---|---|---|---|
| 2015/0358171 A1* | 12/2015 | Rosenberg | H04L 12/1822 |
| | | | 709/204 |
| 2016/0259742 A1* | 9/2016 | Faulkner | G06F 3/0653 |
| 2017/0374318 A1 | 12/2017 | Yang et al. | |
| 2019/0082044 A1* | 3/2019 | Melendez | H04M 1/72569 |
| 2019/0227702 A1* | 7/2019 | Latzina | G06F 3/0481 |

FOREIGN PATENT DOCUMENTS

| | | |
|---|---|---|
| WO | 2017177850 A1 | 10/2017 |
| WO | 2017220004 A1 | 12/2017 |

* cited by examiner

AUTOMATIC DEPLOYMENT OF DISTRIBUTED VIDEO CONFERENCE SYSTEM

CROSS-REFERENCE TO RELATED APPLICATION

This application claims priority to Norwegian Application No. NO20180905, filed Jun. 27, 2018, entitled AUTOMATIC DEPLOYMENT OF DISTRIBUTED VIDEO CONFERENCE SYSTEM, the entirety of which is herein incorporated by reference.

FIELD

The present disclosure relates to automatic deployment of a distributed video conference system in cloud services.

BACKGROUND

Transmission of moving pictures and audio in real-time is employed in several applications like e.g. video conferencing, net meetings and video telephony. Video conferencing systems allow for simultaneous exchange of audio, video and data information among multiple conferencing sites. Control units such as Multipoint Control Units (MCUs) allow endpoints of multiple sites to intercommunicate in a conference.

An endpoint, as exemplified in FIG. 1, may be defined as any suitable device or apparatus that is configured to provide visual and audio communication to one or more participants at a conference site, such as traditional stationary video conferencing endpoints 120, computer devices and mobile devices 130, e.g. smartphones, tablets, personal devices and PCs. For example, as FIG. 1 illustrates, a video conferencing system 100 comprises endpoints 120, 130 that are interconnected via an internet protocol (IP) network 150.

A control unit 140 links sites, endpoints and participants together by receiving conference signals from the sites/endpoints, processing the received signals, and transmitting the processed signals to appropriate sites/endpoints. The conference signals include audio, video, data and control information. The control unit may translate signals from one video or audio codec to another codec, change picture size, change video quality, change video quality, change bitrate, combine conference signals from multiple participant into various layouts etc. The control unit processes the received conference signals from one or more sites/endpoints based on the requirements-/capabilities of each site/endpoint receiving signals from the control unit. This is in the following referred to as transcoding.

FIG. 1 illustrates an exemplary distributed video conferencing system. The control unit 140, in traditional systems configured as a single unit, is here configured as a virtual entity comprising a plurality of interconnected conferencing nodes. The conferencing nodes handle all conference media and signaling to endpoints and other devices, and are typically deployed in different geographical locations. The different conferencing nodes are typically located close to large concentrations of users to reduce latency and improve QoE (Quality of Experience). The distributed video-conferencing system further comprises at least one Management Node. The purpose of the at least one Management Node is to create and manage Conferencing Nodes. The at least one Management Node is in neither the signaling nor the media path of a conference.

The at least one Management Node and the plurality of conferencing nodes are both software applications that are deployed as Virtual Machines (VMs) on host servers distributed around the globe. A deployment can reside on a server in a private data center or in an IaaS (Infrastructure as a Service) cloud service such as Amazon AWS, Microsoft Azure, IBM Softlayer, Google GCP. Conferencing Nodes may run on host servers in the same or different locations, allowing a globally distributed system. Two Conferencing Nodes may also be running on the same host server, for example to ensure service continuity during upgrade of one of the Conferencing Nodes or software outage, and for maximum performance. Conferencing Nodes hosting the same conference may send the call media and other data, such as roster lists, commands, between each other over a secure backplane. The at least one Management Node may run on the same host server as a Conferencing Node, or on a different host server than any the Conferencing Nodes.

With the increased adoption of enterprise collaboration and conferencing, it is becoming increasingly difficult to plan for sufficient infrastructure capacity. A company may have a basic capacity for everyday usage, but requiring additional resources for special needs, such as an all-hands meeting. Prior art supports this by enabling expansion from a primary infrastructure to a private or public cloud IaaS service whenever scheduled or unplanned usage requires it. Then, when capacity demand normalizes, the cloud instance may be shut down. The primary infrastructure may be an on-premise deployment, a private or a public cloud IaaS service. Prior art also enables dynamic distribution of media processing to reduce bandwidth consumption and reduce the negative impacts of latency, jitter, and packet loss commonly experienced on centralized deployments.

The primary infrastructure, whether being an on-premise deployment or a cloud IaaS, is sized to handle a basic capacity for transcoding media. Transcoding media is compute-intensive and requires that the primary infrastructure has sufficient processing power. As processing power is expensive, the primary infrastructure may be deployed in the least expensive IaaS service to reduce cost. This may have a negative impact on latency, jitter, and packet loss if the IaaS data centers are located far from the endpoints. Alternatively, the primary infrastructure may be deployed in the IaaS service that have IaaS data centers in the most optimal locations with respect to the endpoints. This may have a negative impact on cost of the primary infrastructure.

Performing an installation of a distributed video conferencing system in an IaaS cloud service is a complex task that requires knowledge of the limitations of the different IaaS cloud services, of how to optimally configure the Conferencing Nodes, and how the limitations of the different IaaS cloud services affect the available configurations of the Conferencing nodes. Furthermore, the different IaaS cloud services have non-compatible API's (application programming interface).

Current installations of distributed systems are typically limited to one IaaS, and do not take full advantage of dynamic deployment and redistribution to reduce cost, bandwidth consumption and improve QoE.

Thus, there is a need for a solution providing automatic deployment and reconfiguration of a distributed video conference system in more than one cloud service.

SUMMARY

In view of the above, an object of the present disclosure is to overcome or at least mitigate drawbacks of prior art video conferencing systems.

This object is achieved, in a first aspect, by providing a method of deploying a distributed videoconferencing system in cloud services; comprising receiving, by an orchestration server, a proposed configuration of a distributed videoconferencing system, determining, by the orchestration server, a status of the proposed configuration of the distributed videoconferencing system, determining, by the orchestration server, based on the status of the proposed configuration of the distributed videoconferencing system, a determined configuration of the distributed videoconferencing system, initiating, by the orchestration server, according to the determined configuration of the distributed videoconferencing system at least one non-transcoding node at a first data center of a first cloud service provider, and initiating, by the orchestration server, according to the determined configuration of the distributed videoconferencing system at least one transcoding node at a second data center.

In a second aspect, this object is achieved by an orchestration server for a distributed video conferencing system, the orchestration server comprising input/output circuitry, a processor and a memory, said memory containing instructions executable by said processor whereby orchestration server is operative to receive a proposed configuration of the distributed videoconferencing system, determine a status of the proposed configuration of the distributed videoconferencing system, determine, based on the determined status of the proposed configuration of the distributed videoconferencing system, a configuration of the distributed videoconferencing system, initiate, according to the determined configuration of the distributed videoconferencing system at least one non-transcoding node at a first data center of a first cloud service provider, initiate, according to the determined configuration of the distributed videoconferencing system at least one transcoding node at a second data center.

In another aspect, there is provided a computer program comprising instructions which, when executed on at least one processor in a orchestration server, cause the control unit to carry out the method according to the aspect summarized above.

In another aspect there is provided a carrier, comprising the computer program of the aspect summarized above, wherein the carrier is one of an electronic signal, an optical signal, a radio signal and a computer readable storage medium.

These further aspects provide the same effects and advantages as for the first aspect.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

Figure 1:
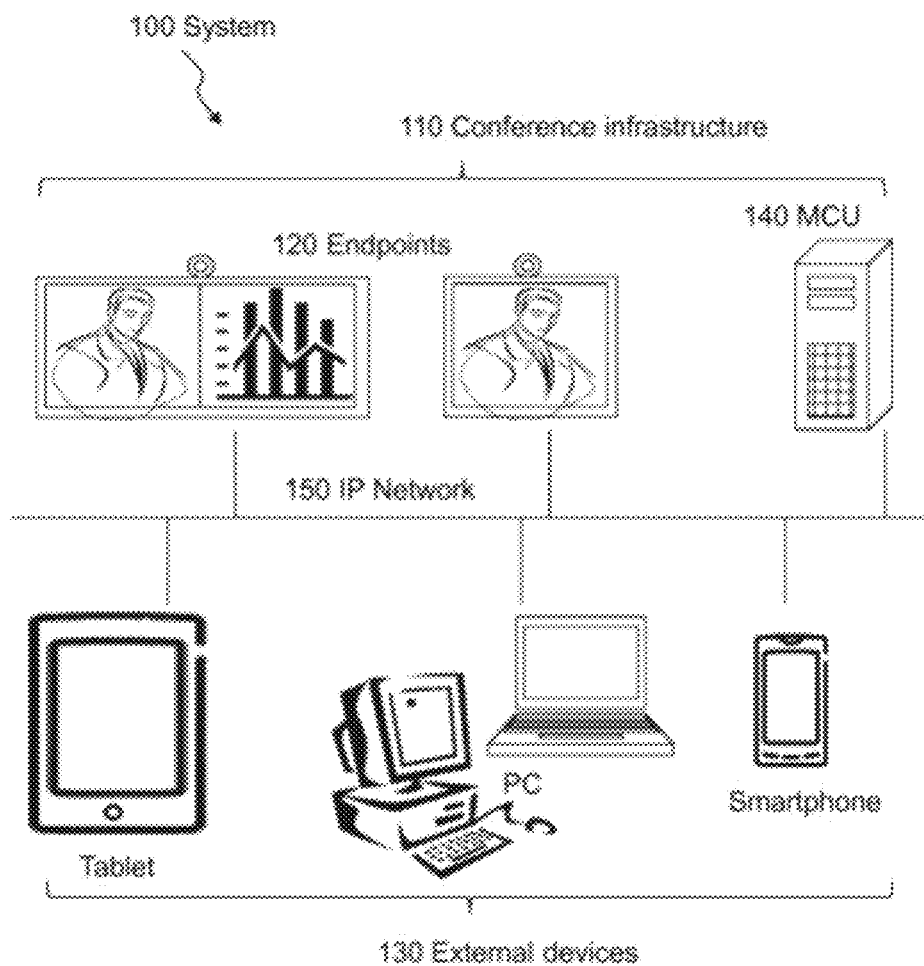
FIG. 1 schematically illustrates a video conferencing system.
Figure 2:
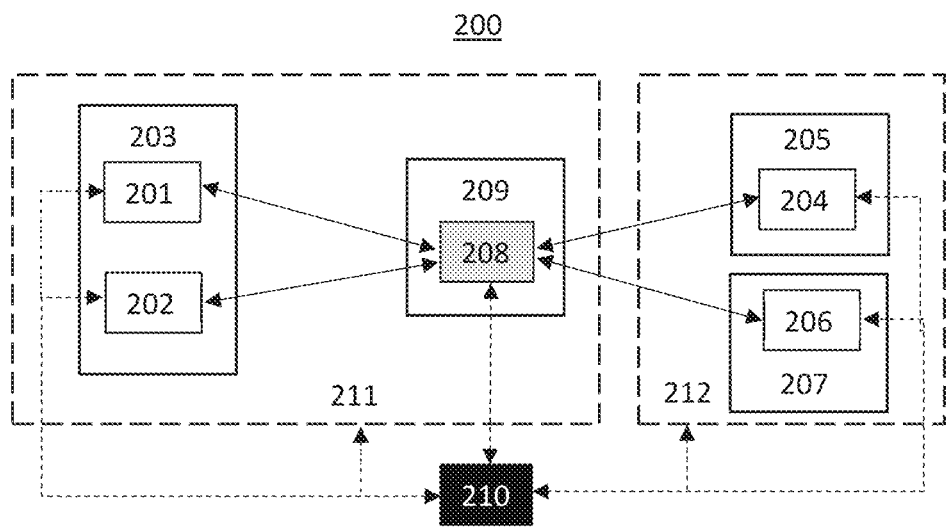
FIG. 2 schematically illustrates a distributed video conferencing system.

FIG. 2 illustrates an exemplary distributed video conferencing system 200 according to one embodiment. The video conferencing system 200 comprises a plurality of forwarding nodes 201, 202, 204, 206, that are statically located in a plurality of IaaS data centers 203, 205, 207. The forwarding nodes 201, 202, 204, 206 are non-transcoding nodes and do not need the processing power of the primary infrastructure of prior art. As cloud service providers bill IaaS services based on the amount of resources allocated by the service and/or consumed by the service, the cost of the non-transcoding nodes is lower than for transcoding nodes. The forwarding nodes 201, 202, 204, 206 may therefore be located in IaaS data centers selected to increase quality of experience for participants in a video conference without worrying about high costs. The forwarding nodes 201, 202, 204, 206 are always on. A transcoding node 208 located in an IaaS data center 209 performs the transcoding for the system. Although only one transcoding node 208 is shown, the system may have a plurality of transcoding nodes. Furthermore, an orchestration server 210, comprising one or more management nodes, contains a database with data about one or more customers of the distributed video conferencing system 200. The data of the database comprises at least one or more metrics, such as the number of users of each customer, location of users, historical data and planned meetings. The orchestration server 210 is furthermore adapted to communicate with a plurality of cloud service providers 211, 212. In one embodiment the orchestration server 210 communicates with the cloud service providers 211, 212 through dedicated API's (application programming interface) for each of the cloud service providers. The orchestration server 210 requests data from the cloud service providers 211, 212 regarding the capabilities and costs of their clouds services, such as IaaS. The data comprises at least one of cost of consumed resources, cost of allocated resources, available features, available resources, and geographical location of the data centers 203, 205, 207, 209 of the cloud service provider. In the exemplary embodiment of FIG. 2, two IaaS data centers 203, 209 are provided by a first cloud service provider 211, and two IaaS data centers 205, 207, are provided by a second cloud service provider 212.

Figure 3:
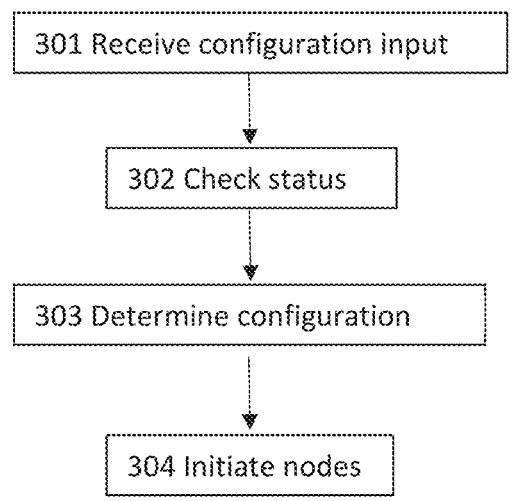
FIG. 3 is a flowchart illustrating an exemplary method of deploying a distributed videoconferencing system in cloud services.

FIG. 3 illustrates an exemplary method 300 of deploying a distributed videoconferencing system in cloud services. In step 301, an orchestration server 210 receives a proposed configuration of a distributed videoconferencing system. The proposed configuration of the distributed videoconferencing service may be a default configuration provided by a provider of cloud video services, or be provided by a customer of the cloud video service provider. The proposed configuration may comprise information about anticipated locations of users, maximum allowable cost, etc. One exemplary use case is to help a new customer of the cloud video service provider setting up a video conferencing system or a potential customer wanting to try out a cloud video service. The customer may then enter a graphical portal, where the customer may for example:

Select initial hint about locations to connect to the video conferencing system, for example by pointing and clicking at a map representing the world.

Select initial hint about expected usage, for example by pointing and clicking at a graphical element such as a slider or similar, representing capacity in number of concurrent users.

Select initial hint about which features to enable, for example by selecting from a list of available services such as Microsoft Teams interoperability, H.323 interoperability, Scheduling functionality, etc., While the customer is selecting/modifying the cloud service/capacity/location/services, the graphical interface may continuously update the approximate cost of the distributed videoconferencing system for the customer, typically as dollars per month. The approximate cost may be displayed for informational purpose. The approximate cost may also be selected as a preferred or firm upper limit for the cost of distributed videoconferencing system. Once the customer is happy with the choices, he may start the deployment by clicking on a GO button.

Regardless of how the orchestration server 210 receives the proposed configuration of a distributed videoconferencing system, the next step 302, is to determine, by the orchestration server, a status of the proposed configuration of the distributed videoconferencing system 200. As described above, the orchestration server 210 requests data from a plurality of cloud service providers 211, 212, to obtain knowledge about at least one of cost of consumed resources, cost of allocated resources, available features, available resources, and geographical location of the data centers of the cloud service provider(s).

In step 303, the orchestration server 210, based on the status of the proposed configuration of the distributed videoconferencing system 200, determine a determined configuration of the distributed videoconferencing system 200, e.g. selects the appropriate data center and cloud service provider to reduce cost and/or increase QoE as required by the customer.

In step 304, the orchestration server 210, according to the determined configuration of the distributed videoconferencing system initiates at least one non-transcoding node 201, 202, 204, 206 at a first data center 203, 205, 207 of a first cloud service provider 211, 212, and at least one transcoding node 208 at a second data center 209. The orchestration server 210 typically selects the first data center 203 to increase the QoE between the first data center 203 and a user or group of users. As the non-transcoding node does not consume a lot of resources or need much allocated resources compared to a transcoding node, the first data center may be the data center in closest, or almost closest, proximity to the user or group of users or the best, or almost best, available bandwidth connection to the user or group of users, without needing to worry about costs. Furthermore, as the transcoding is performed elsewhere, the selection of a non-transcoding node does not need to take into consideration video conferencing features that are only available at the data centers of certain cloud service providers. The second data center 209 may be a second data center of the first service provider 211. Alternatively, the second data center may be a data center of a second cloud service provider. In one embodiment, illustrated in FIG. 2, the first data center 205, 207 is a data center of a first cloud service provider 212, and the second data center 209 is a data center of a second cloud service provider 211. In one embodiment the second data center constitutes a part of the first data center, e.g. the first data center is a low resource service, whereas the second data center potentially requires a large amount of allocated resources.

When the deployment is completed, the customer may be presented with several hyperlinks such as a link to the management portal for his deployment or a link to download a software client to use as a voice/video communications client.

Figure 4:
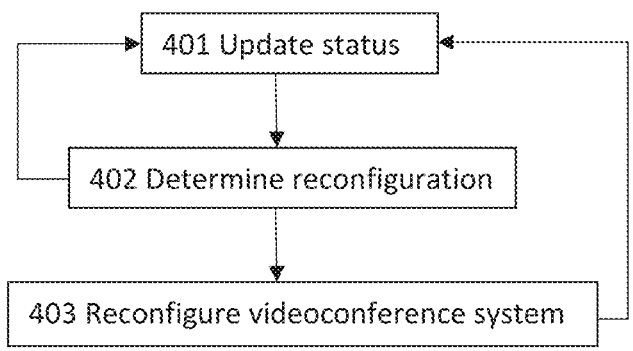
FIG. 4 is a state diagram illustrating an exemplary method of reconfiguring a distributed videoconferencing system, FIGS. 5A-5C schematically illustrates an exemplary method of automatic deployment and reconfiguration of a distributed video conference system, FIGS. 6A-6C schematically illustrates an exemplary method of automatic deployment and reconfiguration of a distributed video conference system, FIGS. 7A-7C schematically illustrates an exemplary method of automatic deployment and reconfiguration of a distributed video conference system, and FIGS. 8A-8C schematically illustrates an exemplary method of automatic deployment and reconfiguration of a distributed video conference system.

FIG. 4 is a state diagram of an exemplary method of reconfiguring the distributed videoconferencing system. FIG. 4 may indicate that at least one embodiment of the invention concerns a method for managing a deployment of a distributed videoconferencing system on a cloud service. The orchestration server continuously updates 401 a status of the distributed videoconferencing system. In one embodiment the orchestration server probes the status of the non-transcoding and transcoding nodes. The non-transcoding and transcoding nodes may also send status messages to the orchestration server regularly or upon predetermined triggers. The orchestration server may also probe cloud service providers for pricing and other details regarding the cloud services. The orchestration server, based on the received statuses from a plurality of nodes and the knowledge of the videoconferencing system, determines 402 whether a reconfiguration of the videoconferencing system may be required. The determination that a reconfiguration of the videoconferencing system may be required is not only based on knowledge of the present status, but also knowledge of future statuses of the system, such as knowledge about calendars for users of the videoconferencing system. For example, if many users have a calendar event involving a videoconference call, the system may reconfigure the videoconferencing system to accommodate a large videoconference call. Knowledge of the videoconferencing system may comprise knowledge of historical behavior of the videoconferencing system. The determination that a reconfiguration of the videoconferencing system may be required is in one embodiment based on historical behavior prediction and performed by an AI (artificial intelligence) engine. In example, the AI-engine have learnt that at a specific time once a week, e.g. 9 am Tuesday morning, an all-hands meeting usually takes place and may reconfigure the videoconferencing system to accommodate such a meeting. This reconfiguration does not need the knowledge of any calendar resources.

When the orchestration server has determined that a reconfiguration of the videoconferencing system is required the orchestration server may reconfigure the videoconferencing system 403 by one or more of the following actions: add transcoding nodes, delete transcoding nodes, move media data from one transcoding node to another transcoding node, and the like.

In one embodiment, when determining that a reconfiguration of the videoconferencing system 200 is required, the orchestration server 210 initiates at least a second transcoding node in a third data center. The third data center may be a second data center of the first service provider, a second data center of the second cloud service provider or a data center of a third cloud service provider. Then, the orchestration server, may initiate a media connection between the second transcoding node and the at least one non-transcoding node, or between the second transcoding node and the at least one transcoding node.

Exemplary statuses that may be used to determine that a reconfiguration of the videoconferencing system is required comprises:

Cost: Cloud service providers bill IaaS services based of resources allocated by the service and/or consumed by the service. Price per usage might fluctuate during the day and night, in the weekends, public holidays, in different time zones, consumed resources etc. The orchestration server may select data centers and cloud service providers for the transcoding nodes having the lowest cost at any time.

Usage: The orchestration server may initiate and delete transcoding nodes depending on current and/or future resource requirements.

Quality of Service/Quality of Experience: The orchestration server may initiate and delete transcoding nodes to efficiently use bandwidth resources, reduce latency, packet loss etc.

Co-location: The orchestration server may initiate and delete transcoding nodes to efficiently use the number of required transcoding nodes by co-locating a plurality of non-transcoding node connections to the transcoding nodes.

Geographical location. The orchestration server may initiate and delete transcoding nodes to optimize, or almost optimize, geographical proximity of the transcoding nodes to the non-transcoding nodes.

Calendars: The orchestration server may initiate and delete transcoding nodes based on knowledge of calendars of users of the videoconferencing system.

Historical data: The orchestration server may initiate and delete transcoding nodes based on historical behavior prediction, e.g. performed by an AI-engine.

Feature set: The orchestration server may initiate and delete transcoding nodes based on a required feature set of the transcoding nodes in the videoconference.

Governmental policies: The orchestration server may initiate and delete transcoding nodes based on governmental policies based on the geographical location of users in the videoconference, such as availability of data and cryptographical strength of the media communication.

Figure 5A:
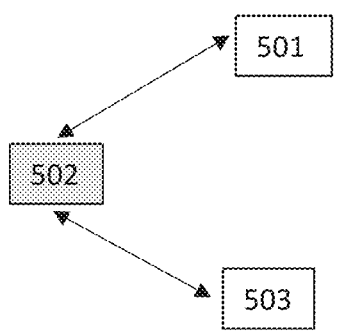
Figure 5B:
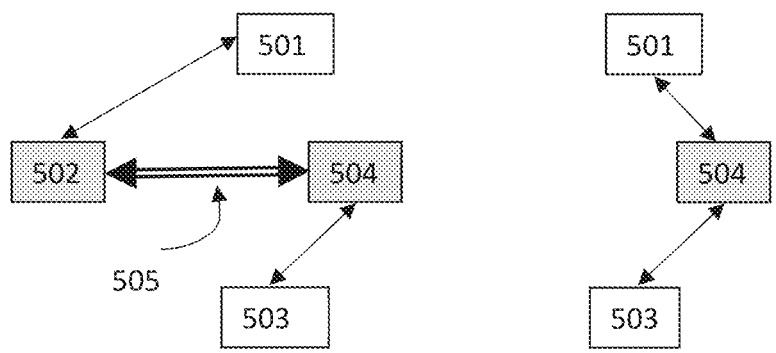
Figure 5C:
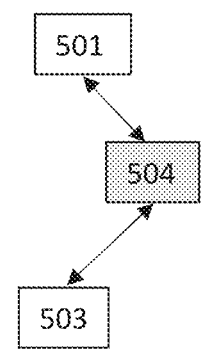

FIGS. 5A-C illustrates an exemplary method of automatic deployment and reconfiguration of a distributed video conference system according to one embodiment based on growing use of a location. FIG. 5A illustrates a situation where ten participants are connected to a first non-transcoding node 501 in a first location, e.g. Oslo. Ten participants are connected to a second non-transcoding node 503 in a second location, e.g. Paris. The system has determined a location for a first transcoding node 502 and initiated the first transcoding node 502 in an IaaS data center in a third location, e.g. London. The first transcoding node 502 then performs transcoding for the 20 participants. When 20 more participants join the conference through the second non-transcoding node 503, the first transcoding node 502 performs transcoding for 40 participants. FIG. 5B illustrates the situation when 10 more participants join the conference through the second non-transcoding node. The number of participants now exceed the processing capabilities of the first transcoding node 502 and the system initiates a second transcoding node 504 in a fourth location, e.g. Munich. The 50 participants connected to the second non-transcoding node 503 are transferred to the second transcoding node 504. In this example the second transcoding node 504 transcodes for the 50 participants of the second non-transcoding node 503, and the first transcoding node 502 transcodes for the 10 participants of the first non-transcoding node 501, and there is an IaaS service provider backbone connection 505 between the first 502 and second 504 transcoding node.

Alternatively, as illustrated in FIG. 5C, the 10 participants of the first non-transcoding node 501 could have been transferred to the second transcoding node 504 too, whereupon the first transcoding node 502 could have been shut down.

Figure 6A:
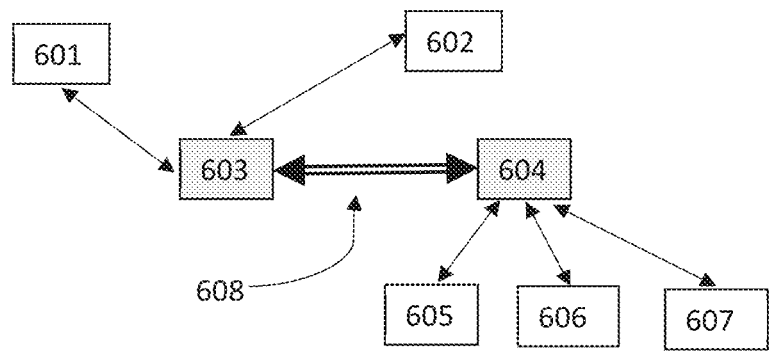
Figure 6B:
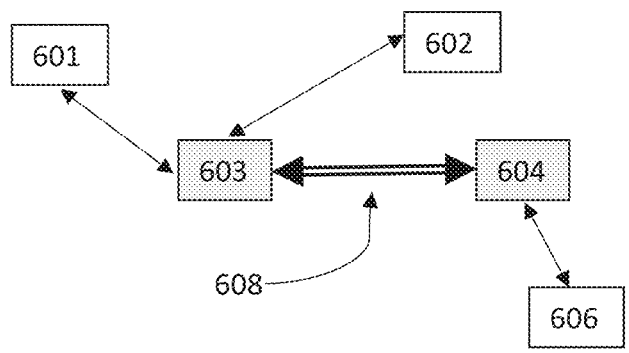
Figure 6C:
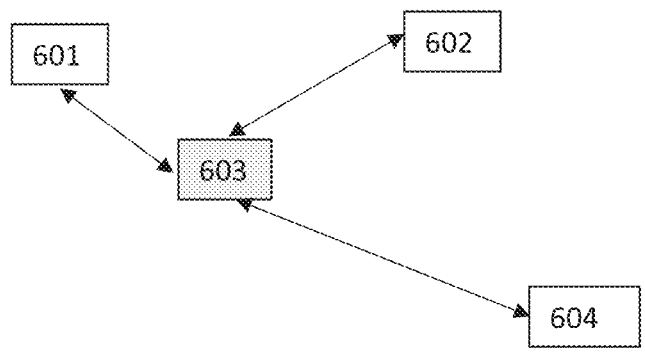

FIGS. 6A-C illustrates another exemplary method of automatic deployment and reconfiguration of a distributed video conference system according to one embodiment based on number of participants and their locations. FIG. 6A illustrates a situation with participants connected to a first non-transcoding node 601 in a first location, e.g. Oslo, participants connected to a second non-transcoding node 602 in a second location, e.g. Edinburgh, participants connected to a third non-transcoding node 605 in a third location, e.g. Paris, participants connected to a fourth non-transcoding node 606 in a fourth location, e.g. Rome, and participants connected to a fifth non-transcoding node 607 in a fifth location, e.g. Barcelona. The system has determined a location for a first transcoding node and initiated the first transcoding node 603 in an IaaS data center in a sixth location, e.g. Kilkenny, and a second transcoding node 604 in an IaaS data center in a seventh location, e.g. Munich. The first transcoding node 603 performs transcoding for the first and second non-transcoding nodes 601, 602. The second transcoding node 604 performs transcoding for the third, fourth and fifth non-transcoding nodes 605, 606, 607. Furthermore, there is an IaaS service provider backbone connection 608 between the first 603 and second 604 transcoding nodes. As illustrated in FIG. 6B, during the conference the system determines that the participants of the third and fifth non-transcoding nodes 605, 607 have left the conference. The system then as illustrated in FIG. 6C, transfers the participants of the fourth non-transcoding node 606 to the first transcoding node 603. The second transcoding node 604 is then shut down.

Figure 7A:
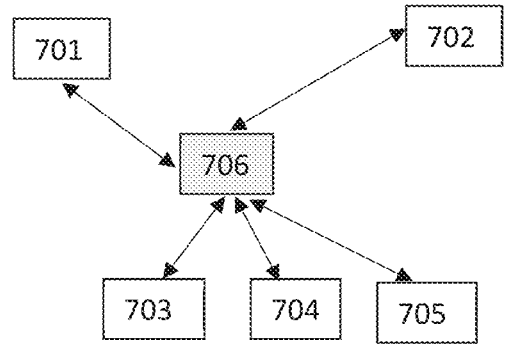
Figure 7B:
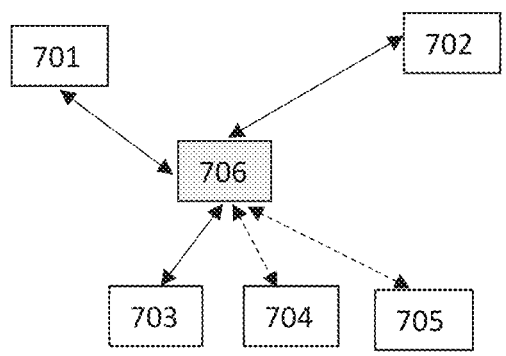
Figure 7C:
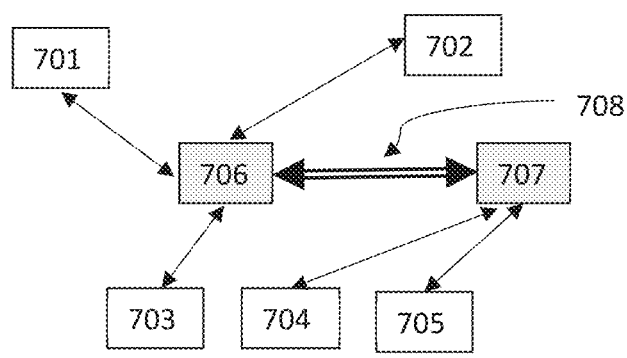

FIGS. 7A-C illustrates another exemplary method of automatic deployment and reconfiguration of a distributed video conference system according to one embodiment based on bandwidth issues. FIG. 7A illustrates a situation with participants connected to a first non-transcoding node 701 in a first location, e.g. Oslo, participants connected to a second non-transcoding node 702 in a second location, e.g. Edinburgh, participants connected to a third non-transcoding node 703 in a third location, e.g. Paris, participants connected to a fourth non-transcoding node 704 in a fourth location, e.g. Rome, and participants connected to a fifth non-transcoding node 705 in a fifth location, e.g. Barcelona. The system has determined an optimal, or near optimal, location for a first transcoding node and initiated a first transcoding node 706 in an IaaS data center in a sixth location, e.g. Amsterdam. The first transcoding node 706 performs transcoding for all of the non-transcoding nodes 701, 702, 703, 704, 705. As illustrated in FIG. 7B, during the conference the system detects that there are bandwidth issues, such as high latency, jitter, and packet loss, between the fourth and fifth non-transcoding node 704, 705 and the first transcoding node 706. The system then, as illustrated in FIG. 7C, determines to initiate a second transcoding node 707 in an IaaS data center in a seventh location, e.g. Munich, geographically closer to the fourth and fifth non-transcoding nodes 704, 705, i.e. Rome and Barcelona, than the first transcoding node, i.e. Amsterdam, and transfers the participants of the fourth and fifth non-transcoding nodes 704, 705 to the second transcoding node 707. The second transcoding node 707 then performs transcoding for the fourth and fifth non-transcoding nodes 704, 705. Furthermore, there is an IaaS service provider backbone connection 708 between the first and second transcoding nodes 706, 707.

Figure 8A:
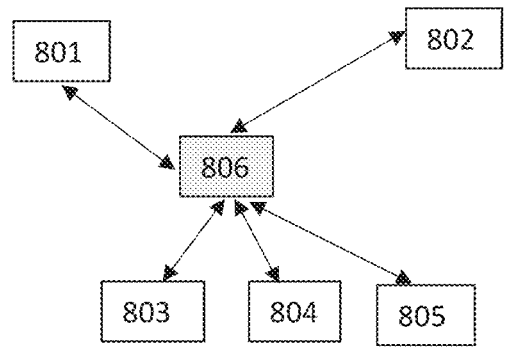
Figure 8B:
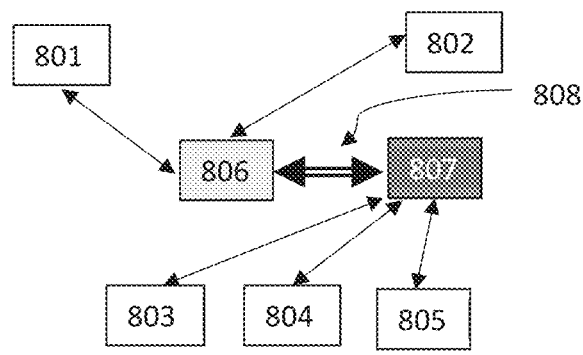
Figure 8C:
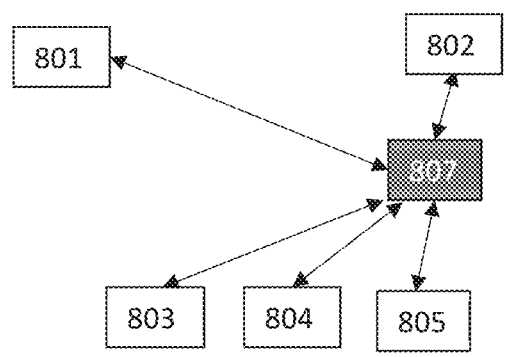

FIGS. 8A-C illustrates another exemplary method of automatic deployment and reconfiguration of a distributed video conference system according to one embodiment based on cost. FIG. 8A illustrates a situation with participants connected to a first non-transcoding node 801 in a first location, e.g. Oslo, participants connected to a second non-transcoding node 802 in a second location, e.g. Edinburgh, participants connected to a third non-transcoding node 803 in a third location, e.g. Paris, participants connected to a fourth non-transcoding node 804 in a fourth location, e.g. Rome, and participants connected to a fifth non-transcoding node 805 in a fifth location, e.g. Barcelona. The system has determined an optimal, or near optimal, location for a first transcoding node and initiated a first transcoding node 806 in an IaaS data center in a sixth location, e.g. Amsterdam. The first transcoding node 806 performs transcoding for all of the non-transcoding nodes 801, 802, 803, 804, 805. IaaS data center cost varies during the day and may be different for different IaaS service providers. During the conference, the system determines that performing all of the transcoding at the first transcoding node 806 using a first IaaS service provider is not cost efficient. Then, as illustrated in FIG. 8B, the system initiates a second trans-coding node 807 in a seventh location, e.g. Munich, at a second IaaS service provider. Alternatively, the second transcoding node 807 may be in the same geographical location as the first transcoding node 806, but at a second IaaS service provider. The participants of the third, fourth and fifth non-transcoding nodes 803, 804, 805 are transferred to the second transcoding node 807. Furthermore, a dedicated connection 808 is set up between the first and second transcoding nodes 806, 807. In another embodiment, as illustrated in FIG. 8C, all of the non-transcoding nodes 801, 802, 803, 804, 805 are transferred to the second transcoding node 807, and the first transcoding node 806 is shut down.

As used herein, the terms "node" and "server" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a cloud system, which may comprise a set of server machines. In case of a cloud system, the terms "node" and "server" may refer to a virtual machine, such as a container, virtual runtime environment, a software module or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "first", "second", "third" etc. may have been used merely to distinguish features, apparatuses, elements, units, or the like from one another unless otherwise evident from the context.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of deploying a distributed videoconferencing system in cloud services, the method comprising:
   receiving, by an orchestration server, a proposed configuration of a distributed videoconferencing system;
   determining, by the orchestration server, a status of the proposed configuration of the distributed videoconferencing system;
   determining, by the orchestration server, based on the status of the proposed configuration of the distributed videoconferencing system, a determined configuration of the distributed videoconferencing system;
   initiating, by the orchestration server, according to the determined configuration of the distributed videoconferencing system at least one non-transcoding node at a first data center of a first cloud service provider;
   initiating, by the orchestration server, according to the determined configuration of the distributed videoconferencing system at least one transcoding node at a second data center;
   continuously, by the orchestration server, updating the status of the distributed videoconferencing system; and
   when determining, by the orchestration server, that a reconfiguration of the videoconferencing system is required based at least on the updated status of the distributed video conferencing system, initiating at least a second transcoding node in a third data center and initiating a media connection between the second transcoding node and the at least one non-transcoding node or the at least one transcoding node.

2. The method according to claim 1, wherein the second data center is initiated at a second cloud service provider.

3. The method according to claim 1, wherein the second data center is initiated at the first cloud service provider.

4. The method according to claim 1, wherein the status comprises at least one of cost, usage, Quality of Service, Quality of Experience, co-location, geographical location, calendars, historical data, feature set and governmental policies.

5. The method according to claim 4, further comprising determining the status of the distributed videoconferencing system based on historical behavior prediction.

6. An orchestration server for a distributed video conferencing system, the orchestration server comprising input/output circuitry, a processor and a memory, said memory containing instructions executable by said processor to configure the orchestration server to:
- receive a proposed configuration of the distributed videoconferencing system;
- determine a status of the proposed configuration of the distributed videoconferencing system;
- determine, based on the determined status of the proposed configuration of the distributed videoconferencing system, a configuration of the distributed videoconferencing system;
- initiate, according to the determined configuration of the distributed videoconferencing system, at least one non-transcoding node at a first data center of a first cloud service provider;
- initiate, according to the determined configuration of the distributed videoconferencing system, at least one transcoding node at a second data center;
- continuously update the status of the distributed videoconferencing system; and
- when determining that a reconfiguration of the videoconferencing system is required based at least on the updated status of the distributed video conferencing system, initiate at least a second transcoding node in a third data center and initiate a media connection between the second transcoding node and the at least one non-transcoding node or the at least one transcoding node.

7. The orchestration server according to claim 6, wherein the second data center is initiated at a second cloud service provider.

8. The orchestration server according to claim 6, wherein the second data center is initiated at the first cloud service provider.

9. The orchestration server according to claim 6, wherein the status comprises at least one of cost, usage, Quality of Service, Quality of Experience, co-location, geographical location, calendars, historical data, feature set and governmental policies.

10. The orchestration server according to claim 6, wherein the orchestration server further comprises an Artificial Intelligence (AI) engine configured to determine the status of the distributed videoconferencing system based on historical behavior prediction.

11. A computer program comprising instructions which, when executed on at least one processor in an orchestration server, cause the orchestration server to perform the method according to claim 1.

* * * * *